Figure 1:
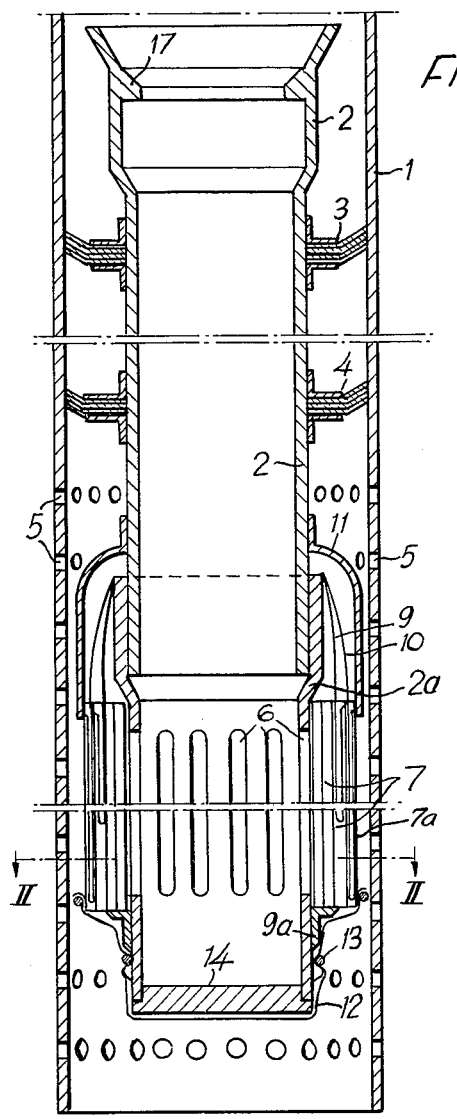

Nov. 9, 1965   L. O. H. JOHANSSON   3,216,505
WELL SCREEN

Filed July 22, 1963   2 Sheets-Sheet 1

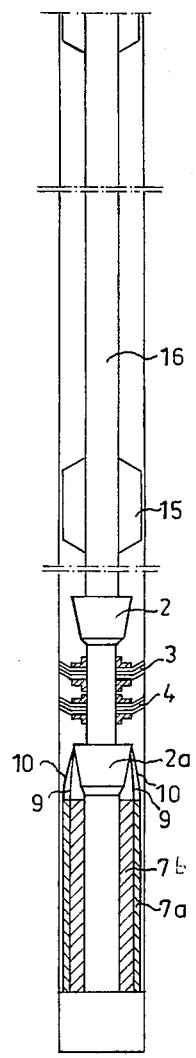
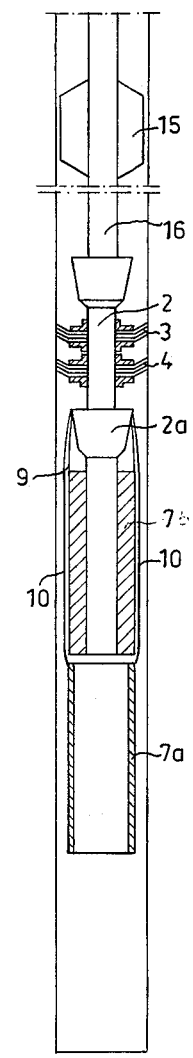

United States Patent Office 3,216,505
Patented Nov. 9, 1965

3,216,505
WELL SCREEN
Liss Olof Hilding Johansson, Brogatan 6,
Halmstad, Sweden
Filed July 22, 1963, Ser. No. 296,734
4 Claims. (Cl. 166—230)

Pipe-lined wells are used for obtaining underground water at great depths from soft earth-layers. A conventional type of pipe-lined well is sunk by driving a thick-walled pipe down into the ground so far as to project below the level of the water. The ground material contained in the pipe is removed and a pump pipe perforated at its lower part is lowered into the first-named pipe whereupon layers of sand or gravel are poured around the perforated part so as to form a filter. Then the thick-walled pipe is taken up.

The underground water often contains fine solid impurities and/or dissolved salts which by sedimentation and precipitation, respectively, in a relatively short time clog the filter. In order to renew the filter it is necessary to take up the pump pipe and to lower the external thick-walled pipe again and usually to remove the previously used filter material, to lower the pump pipe again, to apply filtering layers of sand or gravel and to take up the thick-walled pipe. Since the depth may amount to 300 feet or even more, it will be obvious that the exchange of filter is an extremely expensive operation.

In other types of pipe-lined wells the pump pipe is provided with one or more layers of filter cloths around its perforated lower part. In such a construction the well shaft in the ground for the pump pipe is so narrow that the filter is in direct contact with the surrounding earth-layer. If such a filter has to be exchanged because of clogging the filter cloth will so firmly adhere to the surrounding ground material as to be torn asunder when the pump pipe is taken up, resulting in that filter cloth fragments will remain in the well shaft. When the well pipe provided with fresh filter cloths is sunk again the filter fragments will cover a considerable part of the surface of the fresh filter the capacity of which will not correspond to calculation.

This invention has for its object to eliminate the above named inconveniences and relates to a pipe-lined well of the type in which a pipe driven into the ground is perforated at its lower part and the perforations are surrounded by a filter. In its broadest aspect the well according to the invention is characterized in that a lining pipe having perforations at its lower part and driven into the ground and cleared of ground material houses on a level with said perforations an also perforated tube which is surrounded by a filter and above its perforated part externally tightly separated from the lining pipe, said filter being composed of a radially collapsible external filtering portion and an inner supporting portion connected to said tube, said external portion being withdrawable from the inner portion and connected to the tube in a manner such that the external portion in case of adhesion to the lining pipe on elevation of the tube is carried along with the tube only after the supporting portion has been withdrawn from the external portion which due to radial contraction is then detachable from the lining pipe. This arrangement ensures that no parts of the filter remain in the lining pipe when the tube is taken up for exchanging the filter.

Figure 2:
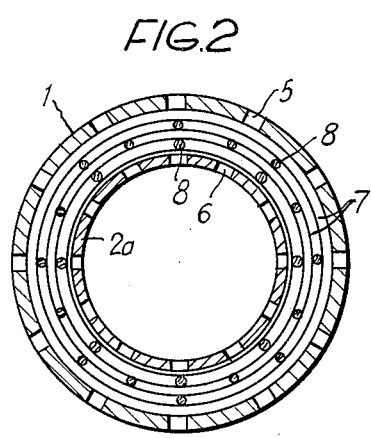

The invention is described more closely hereinbelow with reference to an embodiment thereof illustrated in the annexed drawing. FIG. 1 is a vertical sectional view of the lower part of a pipe-lined well devised in accordance with the invention. FIG. 2 is a cross-sectional view taken along the line II—II in FIG. 1. FIGS. 3 and 4 illustrate two different stages of removal of an insert located in the well according to FIG. 1 and carrying the filtering device for exchanging the filter.

Referring to FIG. 1 numeral 1 denotes the lower part of a lining pipe, made for instance of steel, driven into the ground. The illustrated lower end part of the pipe 1 is assumed to be surrounded by layers of loose earth or sand containing underground water. Lowered into the pipe 1 is a tube 2 which preferably consists of plastic and the upper part of which carries two sealing members 3, 4 in the form of leather or rubber rings preventing water from passing into the annular space between the lining pipe 1 and the tube 2. The said members 3, 4 serve also to support tube 2 in pipe 1. Below the sealing member 4 the lining pipe 1 has a plurality of holes 5.

In the embodiment illustrated the tube 2 consists of two parts welded or glued to each other, the lower part 2a having longitudinally extending slots 6. Disposed around the slotted portion of the tube part 2a are five layers 7b, 7a of filter cloths which suitably may consist of fabrics or nets of plastic threads for instance nylon threads. The outermost layer 7a is most close-meshed and constitutes the real filter, whereas the inner layers 7b are more pervious and act to support the outermost layer. The filter cloths are relatively stiff and in the form of cylinders which are separated from each other by spacers in the form of rods 8, FIG. 2, depending from the tube part 22 to which they are fastened in any suitable manner. In the embodiment exemplified the inner most three filter cloth cylinders 7 rest on a supporting ring 9a which is secured to the part 2a of the tube 2 such as by means of screws, not shown. The outermost two filter cloth cylinders are retained in position by frictional contact with the adjacent filter cloth.

A number of peripherically spaced wires 9 are at one end connected to the upper edge of the outermost but one layer 7b of filter cloth and the other ends of said wires 9 are anchored to the tube part 2a at points above said upper edge. The wires 9 hang down inside said layer 7b in a slack loop and the length thereof is substantially equal to the length of said tube part 2a below the points of anchorage. Further wires 10 are in a similar way arranged between the top edge of the outermost layer 7a and the tube part 2a and also comprise a slack loop each hanging down between said layers 7b and 7a. The length of the last-mentioned loops substantially equals the sum of the length of said tube part 2a below said points of anchorage and the length of said layer 7b. Thus, when the tube 2 and the tube part 2a are raised, the wires 9 first become tensioned to extract said layer 7b when the tube 2 and the tube part 2a are fully withdrawn from the layers 7b and 7a, whereafter the wires 10 are tightened to extract said layer 7a, when said inner layer 7b is fully withdrawn from the outermost layer 7a.

Above the filter described there is provided a sealing sleeve 11, for instance of rubber, which is in tight engagement with the outside of the tube 2 and under a certain tension abuts the outside of the upper end of the outermost filter cloth layer 7a. By means of a suitable clamping ring the upper end of a rubber or plastic cloth 12 is held in tight engagement with the outside of the lower end of the outermost filter cloth layer. The cloth 12 extends around the lower end of the tube 2 where it is retained by a ring 13 which ring also retains the lower edge of the outermost filter layer 7a. Numeral 14 denotes a cap which closes the lower end of the tube 2. This cap need not make a tight fit and merely serves the purpose of forming a support for the cloth 12.

A pump which may be suspended from the delivery pipe of the well is immersed in the lining pipe 1 below the level of the water above the tube 2. In order to reach the space in the lining pipe 1 above the sealing member 3 the water has to pass through the filter cloths 7a and 7b, and the sleeve 11 and cloth 12 prevent the water from entering the filter from the ends thereof. In operation earth, sand and the like matter enter through the holes 5 and through the lower mouth of the lining pipe and may accumulate even in the annular space between the lining pipe 1 and the outermost filter cloth layer 7a.

When on account of clogging the capacity of the filter is reduced so much that the filter has to be exchanged the procedure is as follows.

A rod 16 (FIG. 3) preferably provided with guide members 15 is let down into the lining pipe 1. At its lower end the rod 16 is adapted to engage an internal flange 17 provided at the upper, conical end of the tube 2, FIG. 1. When the rod 16 is lifted the tube 2 will be carried upwardly along together with the innermost three filter cloth layers 7b resting on the supporting ring 9a. It can be assumed that the outermost filter cloth layer 7a because of material deposited between this layer and the inside of the lining pipe 1 will be relatively firmly retained in place and it may even happen that the adjacent inner filter layer, too, cannot be quite simply displaced. In such case the two outer filter layers 7b, 7a will remain in place when the tube 2 is lifted. Consequently, the upper end of the sleeve 11 will glide away from the upper end of the filter. Since already upon a relatively short upward movement of the tube 2 the lower ends of the two outer filter layers have lost the radial support from the inner layers, the upper end of the cloth 12 will be detached from the filter and the cloth will be released and can take part in the upward movement.

After the supporting ring 9a has passed the upper end of the outermost but one filter layer 7b the wires 9 are tightened and exert an obliquely inwardly and upwardly directed force on the upper end of this filter layer which consequently will be subjected to a radical contraction and will be readily detached from the outermost filter layer 7a. Upon continued elevation to the point where also the released outermost but one filter layer 7b has passed the outermost layer, as illustrated in FIG. 4, the wires 10 are tightened and the outermost filter layer 7a will be detached in a corresponding manner from the wall of the lining pipe and will be carried upward.

From the above it will be seen that as the tube 2 is taken up the filter cloths will be subjected to very moderate stresses and will not be torn asunder. Otherwise, filter cloth fragments would remain on the inside of the lining pipe 1.

After the filter has been cleaned or fresh filter cloths have been applied the tube 2 is again lowered to its place in the lining pipe 1 whereupon the pump which has been removed during the exchange of filter can be immersed again in the wall.

The invention is not limited to the embodiment illustrated in the drawing the details of which may be modified within the scope of the appended claims. As previously mentioned the outermost filter cloth layer 7a may be considered the filter proper whereas the inner layers merely act to support the outermost layer. In view thereof modified constructions are conceivable comprising a single filter cloth which is kept in stretched condition by means of an inside supporting structure connected to the tube 2. No more need the filter be made from flexible filter cloth, but it may consist of stiff filter segments provided on the outside of a supporting structure, which filter segments upon elevation of the supporting structure are permitted to tilt inwards and are suspended from wires to be carried along. Carrier means other than wires are conceivable.

The essential thing is that the filter proper which tends to adhere to the lining pipe shall be radially collapsible so as to be readily detached from the wall of the lining pipe upon removal of the supporting structure.

What is claimed is:
1. A well screen comprising a lining pipe having a lower perforated end which lower end extends below the underground fluid level and interior of which is free of ground material;
   a tube having perforations at its lower end and being housed in said lining pipe on a level with the perforated portion of the same;
   filter means surrounding the perforated part of said tube;
   means provided on said tube for supporting said tube in said lining pipe with its upper end in spaced relation to the lining pipe and for sealing the annular space between said lining pipe and said tube;
   said filter means being composed of an external filtering portion and an internal supporting portion, said internal supporting portion comprising at least one pervious sleeve arranged coaxially of the perforated part of said tube and secured thereto and said external filtering portion comprising a plurality of tubular radially collapsible filtering screens coaxially surrounding one another and said internal supporting portion, which portion, when raised with said tube, is withdrawable from the innermost of said screens;
   and means connecting said tube with each screen in such a way that said internal supporting portion when raised by said tube is completely withdrawn from said innermost screen and each screen is completely withdrawn from the next surrounding screen before said connecting means of the innermost screen and next surrounding screens respectively is actuated to carry said screens along with said tube, while detaching each screen from next surrounding screen and from the wall of said well by radial contraction.

2. A well screen as set forth in claim 1 wherein said internal supporting portion comprises at least one layer of a filter cloth.

3. A well screen as set forth in claim 1 wherein said external portion comprises at least one layer of a filter cloth and said internal supporting portion comprises at least one layer of a filter cloth, said filter cloths consisting of fabrics of plastic threads.

4. A well screen as set forth in claim 1, wherein each of said filtering screens is formed of at least one layer of filtering cloth and said connecting means are comprised by a plurality of wires connecting the top edge of each filtering screen with said tube above said external filtering portion, each wire having a slack portion of a length at least equal to the length of said internal portion added to the sum of the lengths of the filtering screens positioned inside of the one filtering screen to which said wire is connected.

References Cited by the Examiner
UNITED STATES PATENTS

| | | | |
|---|---|---|---|
| 60,578 | 12/66 | Sherburne et al. | 166—205 |
| 1,341,755 | 6/20 | Minton | 166—230 X |
| 2,729,294 | 1/56 | Adams | 166—231 |
| 2,985,241 | 5/61 | Hanslip | 166—230 |

JACOB L. NACKENOFF, *Primary Examiner.*

CHARLES E. O'CONNELL, *Examiner.*